(12) United States Patent
Sorg et al.

(10) Patent No.: US 11,939,256 B2
(45) Date of Patent: Mar. 26, 2024

(54) MELT TANK AND GLASS MELTING PLANT

(71) Applicant: Beteiligungen Sorg GmbH & Co. KG, Lohr am Main (DE)

(72) Inventors: Helmut Sorg, Glattbach (DE);
Alexander Sorg, Aschaffenburg (DE);
Matthias Lindig, Ingelheim (DE)

(73) Assignee: Beteiligungen Sorg GmbH & Co. KG, Lohr am Main (DE)

( * ) Notice: Subject to any disclaimer, the term of this patent is extended or adjusted under 35 U.S.C. 154(b) by 198 days.

(21) Appl. No.: 16/561,738

(22) Filed: Sep. 5, 2019

(65) Prior Publication Data
US 2020/0102240 A1   Apr. 2, 2020

(30) Foreign Application Priority Data
Sep. 28, 2018   (DE) .......................... 102018124075.9

(51) Int. Cl.
*C03B 5/03* (2006.01)
(52) U.S. Cl.
CPC ...................................... *C03B 5/03* (2013.01)
(58) Field of Classification Search
None
See application file for complete search history.

(56) References Cited

U.S. PATENT DOCUMENTS

| | | | |
|---|---|---|---|
| 2,254,079 A | | 8/1941 | McAlpine |
| 3,855,945 A | | 12/1974 | Sebilleau et al. |
| 4,584,007 A | * | 4/1986 | Kurata ...................... C03B 5/03 65/337 |
| 4,741,753 A | * | 5/1988 | Sheinkop ................ C03B 5/027 373/41 |
| 4,764,198 A | * | 8/1988 | Lythgoe ................ C03B 5/2257 65/374.13 |
| 4,798,616 A | | 1/1989 | Knavish et al. |
| 4,816,056 A | * | 3/1989 | Tsai ........................ C03B 5/235 65/135.1 |

(Continued)

FOREIGN PATENT DOCUMENTS

| | | |
|---|---|---|
| DE | 19710351 C1 | 5/1998 |
| DE | 19815326 A1 | 10/1999 |

(Continued)

OTHER PUBLICATIONS

German Office Action for corresponding German Patent Application No. 102018124075.9 dated May 6, 2019.

(Continued)

*Primary Examiner* — Queenie S Dehghan
(74) *Attorney, Agent, or Firm* — Greer, Burns & Crain, Ltd.

(57) ABSTRACT

A melt tank for the production of a glass melt having a low portion of bubbles. The melt tank includes an inlet opening, an outlet opening, a floor, at least two side walls that adjoin the floor, a roof. The glass melt having a first bath depth in a melting segment, a second bath depth in a refining segment, and a third bath depth over a threshold between and smaller than the first and second bath depths. An electrically produced first heat energy is supplied via a multiplicity of electrodes that extend into the glass melt and a second heat energy is produced by the combustion of fossil fuel via at least one burner. Also, a method for producing a glass melt.

18 Claims, 8 Drawing Sheets

(56) References Cited

U.S. PATENT DOCUMENTS

| | | | |
|---|---|---|---|
| 4,852,118 A | 7/1989 | Pieper | |
| 5,766,296 A | 6/1998 | Moreau | |
| 6,085,551 A * | 7/2000 | Pieper | C03B 5/04 |
| | | | 373/122 |
| 6,154,481 A | 11/2000 | Sorg et al. | |
| 2004/0099009 A1* | 5/2004 | Linz | C03B 5/185 |
| | | | 65/135.1 |
| 2012/0017643 A1* | 1/2012 | Lindig | C03B 5/04 |
| | | | 65/135.1 |
| 2012/0180531 A1* | 7/2012 | Kuhn | C03B 5/04 |
| | | | 65/347 |

FOREIGN PATENT DOCUMENTS

| | | | |
|---|---|---|---|
| EP | 0410338 A1 | 1/1991 | |
| EP | 3760595 A1 | 1/2021 | |

OTHER PUBLICATIONS

Extended European Search Report for corresponding EP application 19195673.9-1105 dated Jun. 30, 2020.

* cited by examiner

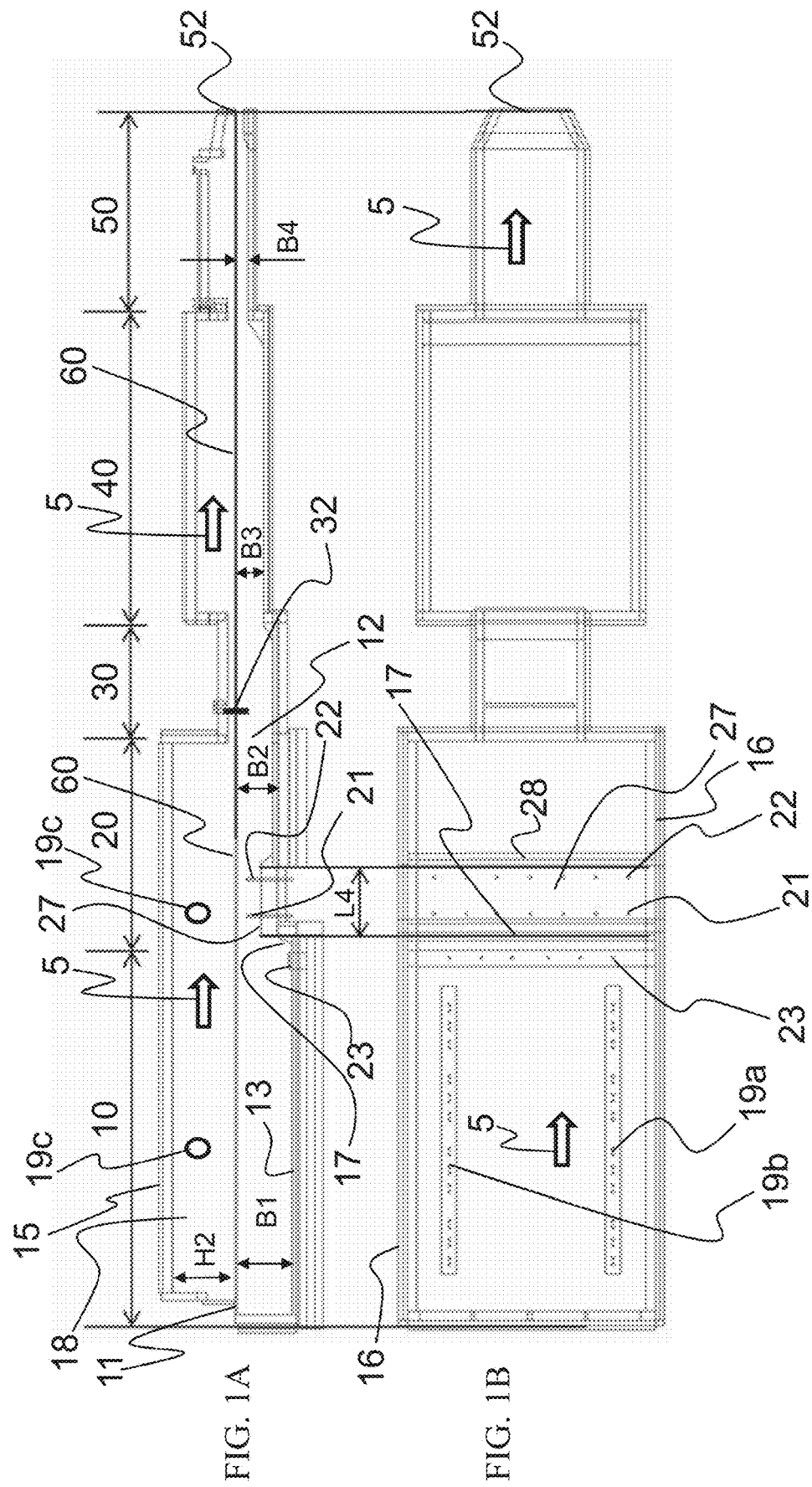

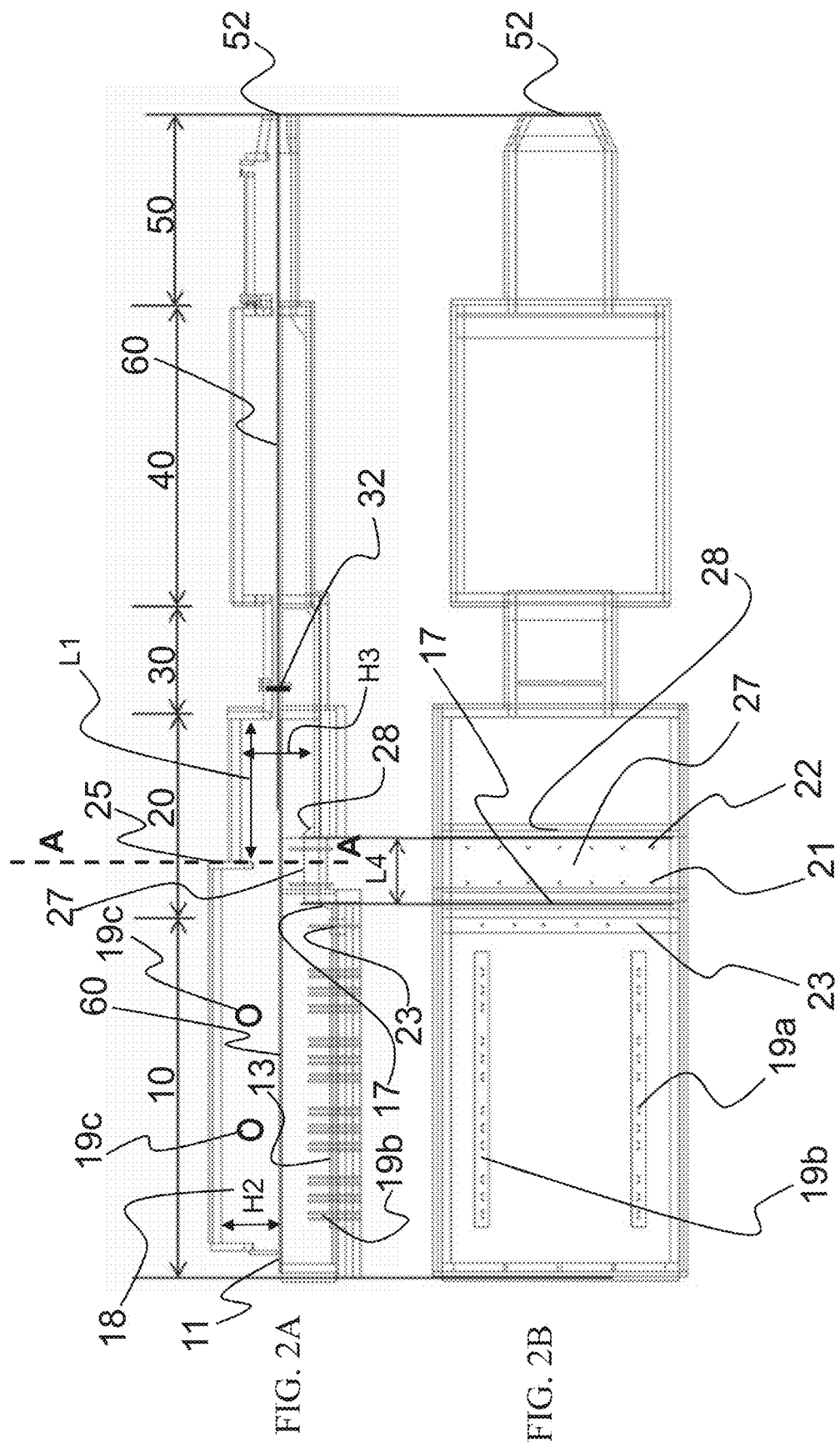

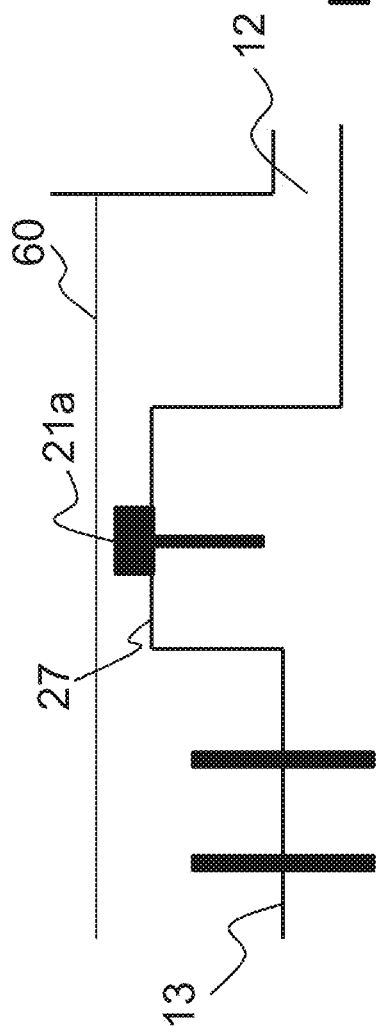
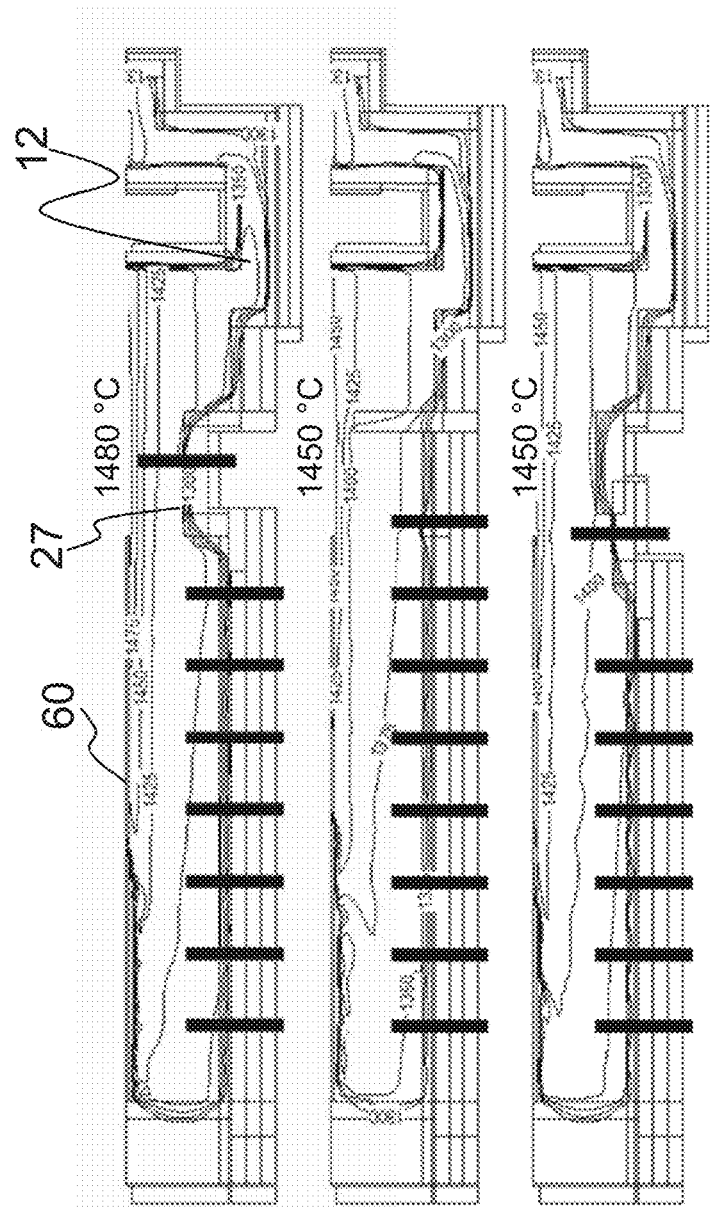
FIG. 9A
FIG. 9B
FIG. 9C

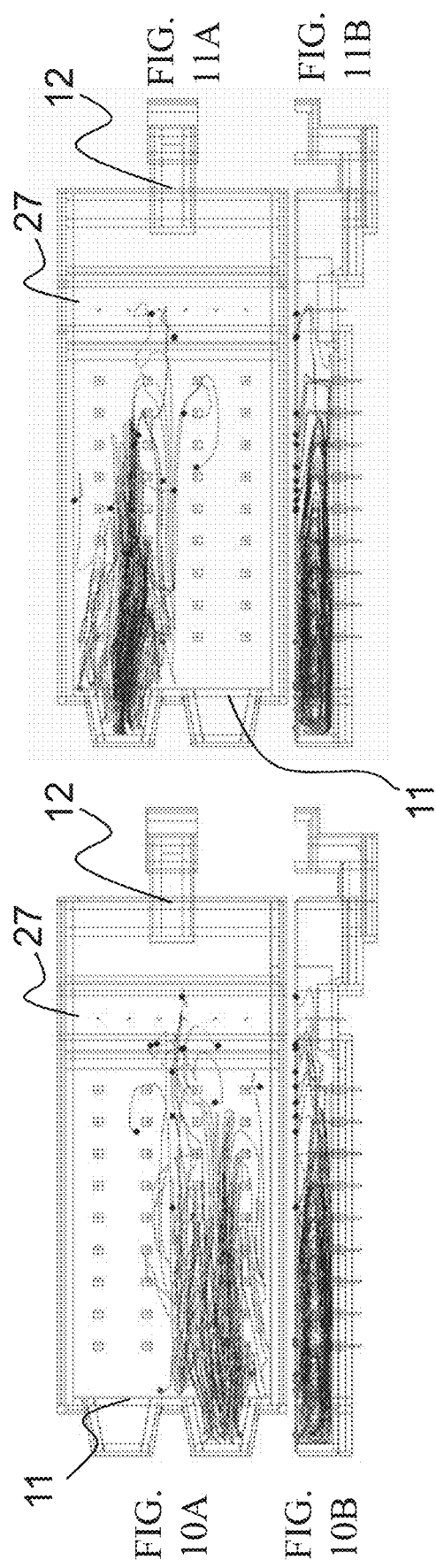

MELT TANK AND GLASS MELTING PLANT

RELATED APPLICATIONS

This application claims priority to German Patent Application No 10 2018 124 075.9, filed on Sep. 28, 2018.

FIELD OF THE INVENTION

The present invention relates to a melt tank for producing a glass melt from at least one solid starting material, having an inlet opening for supplying the at least one starting material, an outlet opening for the flowing out of the melted glass, the melt tank being configured in such a way that during the melting process the glass melt flows in a direction of flow from the inlet opening to the outlet opening, a floor that limits the melt tank at its bottom, at least two side walls that adjoin the floor and that laterally limit the melt tank, and a roof connected to the side walls and limiting the melt tank at the top, the melt tank having a melting segment and a refiner segment, the glass first passing through the melting segment and subsequently through the refining segment when flowing in the direction of flow. In addition, the present invention relates to a glass melting plant having such a melt tank, and to a method for producing a glass melt in such a melt tank.

BACKGROUND OF THE INVENTION

For the continuous production of glass melt in larger quantities, tank technology has prevailed since the end of the 19th century. The at least one starting material is continuously fed into a melt tank of a specified depth. The at least one starting material is melted in the melting segment, and in the refining segment a large number of the bubbles that occur during the melting are removed. In the case of fossil fuel heating, as is mostly used today, above the melt there is situated a combustion chamber in which fossil fuel is combusted through the addition of an oxidant.

Glasses produced in this way include in particular the groups container glass, flat glass, for example for rolling processes, and technical glasses. With regard to their composition, such glasses include for example the group of the soda-lime glasses, the borosilicate glasses, and the neutral glasses.

In the near future, climate protection will have an influence on all types of industrial processes in which thermal process steps are carried out with fossil energy input. This holds in particular for glass production, because the production of the glass melts is very energy-intensive.

As starter materials for glass production, primary raw materials such as quartz sand, soda, lime, dolomite, feldspar, potash, and, possibly, metal ions and the like, as well as shards, are used. The shards can originate as returns from defective productions, and/or may be so-called recycling shards.

Currently, electrical energy is regarded as an energy form that is to replace the energy obtained from fossil energy sources in order to supply energy to technical installations such as glass melting plants. With regard to climate protection, electrical energy should be produced in a climate-neutral fashion. Therefore, it is desirable to heat melt tanks using electrical energy.

It has turned out that supplying a glass melting plant, in particular a melt tank, exclusively with electrical energy, as is described for example in U.S. Pat. No. 3,885,945, leads to problems in the step of degassing the glass melt (refining) In the known electrical heating of a melt tank, the glass melt is heated using electrodes that are situated on the floor of the melt tank or in side walls and that extend into the melt. In the case of such a heating of the glass melt, a large portion of the bubbles that arise in the glass melt may not leave the melt. They remain in the glass melt, and thus also remain in the product produced from the glass melt, where they cause quality problems. This problem also occurs in the glass melting oven described in DE 197 10 351 C1 (Pieper) and in the melt aggregate described in EP 0 410 338 A1 (Müller) when the portion of electrical energy is increased relative to the fossil heating. In the designs shown there, having a refining bank after a step having a series of floor electrodes, or having a high floor wall after two rows of electrodes situated on the floor of the melt aggregate, bubbles cannot escape to an adequate degree.

An object therefore arises of providing a melt tank that is predominantly supplied with power using electrical energy, and whose glass melt has a low bubble content when it leaves the refining segment. Correspondingly, a further object is to provide a glass melting plant having such a melt tank. In addition, an object is to indicate a method with which a glass melt can be produced using predominantly electrical energy, such that the method produces glass having a low portion of bubbles and operates in an energy-efficient manner.

SUMMARY OF THE INVENTION

These objects may be achieved by a melt tank having the features according to one or more embodiments herein.

In particular, in the melt tank according to the present invention the glass melt has a (minimum) first bath depth $B1$ in the melting segment, and has a (minimum) second bath depth $B2$ in the refining segment, the first (minimum) bath depth $B1$ being the minimum of the possibly varying bath depths in the melting segment, and the second (minimum) bath depth $B2$ being the minimum of the possibly varying bath depths in the refining segment. In the following description, the indication "minimum" is often omitted; for the first and the second bath depths, in each case the minimum bath depth in the respective area is meant. In a transition area of the melt tank between the melting segment and the refining segment, there is a threshold in the floor of the glass melt tank, running transverse to the direction of flow, a third bath depth $B5$ over the threshold being smaller than the first bath depth $B1$ and smaller than the second bath depth $B2$, the melting segment being situated before the threshold in the direction of flow, and the refining segment being situated after the threshold in the direction of flow. The bath depth over the threshold is not taken into account in the ascertaining of the minimum bath depth $B1$ and $B2$ in the melting segment and in the refining segment respectively.

In addition, the melt tank is configured in such a way that for the melting of the at least one starting material of the glass melt:

an electrically produced, first heat energy portion is supplied via a multiplicity of electrodes situated in the floor and/or in the side walls of the melt tank and protruding into the glass melt, and in addition, a second heat energy portion, produced by the combustion of fossil fuel, is supplied in at least one burner situated in a side wall and/or in the roof above the glass melt, the total supplied heat energy being made up of the first heat energy portion and the second heat energy portion, the first heat energy portion being at least 30% of the total supplied heat energy, a first row of electrodes, running transverse to the direction of flow and including a multiplicity of electrodes, being situated in the floor of the melt tank, at the threshold, in the direction of flow of the glass melt.

In the context of the present invention (i.e. for all possible exemplary embodiments), the walls in the area of the inlet opening and of the outlet opening, which run transverse to the direction of flow (i.e. the front wall and the rear wall), are also regarded as side walls.

In an exemplary embodiment, the first heat energy portion can be more than 60%, preferably more than 70%, and/or at most 98% of the total supplied heat energy. The remaining heat energy portion is produced by the combustion of a fossil fuel (second heat energy portion). As stated above, the melt tank according to the present invention is supplied with energy from a fossil energy source with a second heat energy portion of at most 70%, preferably less than 40%, particularly preferably at most 30%, and/or at least 2%. It has turned out that it is necessary to provide such a fossil heat energy portion in order to heat the combustion chamber situated above the glass melt. This results in a heating of the surface of the glass melt, promoting an exiting of the bubbles (gas enclosures) from the glass melt. An improvement in quality can be achieved only if the bubbles actually leave the glass melt.

According to the present invention, it has been recognized that, given such a heat energy portion from the fossil energy source, it is necessary to provide an electrically heated threshold in the floor of the melt tank in the area of the transition from the melting segment to the refining segment, the threshold running transverse to the direction of flow of the glass in the glass melt and having a width (i.e. an extension transverse to the direction of flow of the glass) that matches the width of the melt tank at this location. The threshold therefore extends over the entire width of the melt tank. In the direction of flow at the threshold, a first row of electrodes having a multiplicity of electrodes and running transverse to the direction of flow is in addition situated in the floor of the melt tank. This electrically heated threshold brings it about that bubbles rise from lower regions of the melt to the surface. In addition, the threshold having the higher temperature shortens the path of the bubbles in the direction of the surface of the glass melt. The temperature increase in the area of the threshold promotes an expansion of the gas in the bubbles, so that the bubbles become larger in diameter, thereby increasing the speed with which they are driven upward, because, according to Stoke's Law, the rise speed increases as the square of the radius.

In the context of the present invention, a projection in the floor of the respective region of the glass melting plant that runs perpendicular or at an angle in some segments is understood as a step. A step brings about a reduction or increase in the bath depth relative to the bath depth situated before it.

According to the present invention, a threshold is provided in the transition area between the melting segment and the refining segment of the melt tank, the first row of electrodes being situated on the threshold. The threshold is formed, in a way, of a first step and a second step situated after the first step in the direction of flow, the bath depth becoming less after the first step, being designated bath depth B5, and increasing again after the second step. Bath depth B5 over the threshold is smaller than the bath depth in the melting segment and smaller than the bath depth in the refining segment, and is thus the highest raised part in the floor of the melt tank. In other words, in the melt tank according to the present invention, in the refining segment and in the melting segment there are no walls or other raised parts over which the bath depth is smaller than over the threshold in the area of the transition between the melting segment and the refining segment. In the ascertaining of the bath depth of the threshold, the electrodes situated there are not taken into account. This also holds for the melting segment and for the refining segment.

It is advantageous if the third bath depth B5 over the threshold (i.e. in the area between the first and the second step) is between 200 mm and 1000 mm. In an exemplary embodiment, the threshold has a length L4 in the direction of flow of the glass melt (i.e. the length is measured in the direction of flow between the first and the second step) that is between 700 mm and 3000 mm, for example 2150 mm.

According to the present invention, the expression "in the transition area between the melting segment and the refining segment" means that the threshold separates the melting segment from the refining segment.

Here it should be indicated that an exclusively fossil-heated melt tank is known, for example from U.S. Pat. No. 5,766,296, in which a barrier situated in a melt region separates two convection flows in the glass melt from one another. For this purpose, the height of the barrier corresponds to a large portion of the overall bath depth of the glass melt. In addition, the electrodes are situated together with bubblers before or after the barrier, the bath depth after the barrier matching the bath depth before the barrier. Compared to the present invention, the barrier known from U.S. Pat. No. 5,766,296 fulfills a completely different purpose than the step provided in the present invention, and also has a different construction due to the configuration of the electrodes.

With regard to the present invention, the bath depth is the perpendicular distance between the floor of the melt tank, or the floor of some other part of the glass melting plant, and the surface of the glass melt. Correspondingly, bath depth B1 is the minimum of the distance of the floor of the melt tank from the surface of the glass melt in the melting segment and bath depth B2 is the minimum of the distance of the floor of the melt tank from the surface of the glass melt in the refining segment. Both in the melting segment and in the refining segment, additional steps and thresholds may be provided, which however do not reduce the bath depth as much as the threshold situated in the transition region between them having the multiplicity of electrodes.

For the case in which fossil heating is significantly limited (the heat energy portion produced by the combustion of fossil fuel is at most 70%, preferably less than 40%, of the total supply heat energy), due to the heating of the highest segment of the floor of the overall melt tank, the present invention brings about the effective rising of bubbles that result from the decomposition of the carbonate when the raw materials are melted, and that at first have a small diameter. These bubbles move with the flow through the melt tank, become larger, and rise, as described above. Simulations have shown that only when there is a heating of the highest barrier (i.e. of the threshold) of the melt tank between the melting region and the refining region do the bubbles grow and rise in such a way that the glass after the barrier is free of bubbles. The heating of the threshold significantly increases the glass surface temperature in the area of the threshold (see FIG. 9a, in contrast to FIGS. 9b and c). If the highest barrier of the melt tank is cold, i.e. is not heated, then after such a barrier the bubbles sink and do not reach the surface, because the fossil heating is not sufficient to create the high bath surface temperature required for the rise of the bubbles.

In a development of the present invention, a second row of electrodes running transverse to the direction of flow and including a multiplicity of electrodes is situated in the floor of the melt tank at a distance L2 after the first row of electrodes in the direction of flow, the distance L2 (in the direction of flow of the glass melt) between the electrode rows being between 500 mm and 1000 mm in an exemplary embodiment, the second row of electrodes also being situated on the threshold. The glass melt is additionally heated by the second row of electrodes situated on the first threshold after the first row of electrodes, in order to further promote the expansion of the bubbles and thus their rise to the surface of the glass melt. A further improvement in the glass quality is achieved if a further row of electrodes is situated in the floor of the melt tank before the threshold in the direction of flow, running parallel to the at least one first row of electrodes and including a multiplicity of electrodes situated alongside one another that extend from the floor of the melt tank into the melt. The further row of electrodes is situated at a distance of for example 500 mm to 1500 mm before the upper edge of the first step of the threshold, i.e. is still situated in the melting segment.

The bath depth B2 in the refining segment, i.e. in the direction of flow of the glass after the step, is smaller than or larger than or equal to bath depth B1 in the melting segment. In an exemplary embodiment of a melt tank according to the present invention, bath depth B1 in the melting segment is between 1100 mm, preferably between 1400 mm, and 2000 mm, and bath depth B2 in the refining segment is between 700 mm and 2800 mm, preferably between 700 mm and 2500 mm. In an exemplary embodiment, the bath depth can be realized such that B2<B1 in order to promote the rise of the bubbles. For example, bath depth B2 is less than or equal to 65% of bath depth B1.

According to the present invention, the multiplicity of electrodes situated on the threshold is realized as rod electrodes and/or block electrodes. The advantage of the block electrodes is that they do not extend as far from the floor of the melt tank. A block electrode extends approximately 100 mm into the glass melt, and has for example a cuboidal shape, the base surface being for example square. A rod electrode extends further into the glass melt, and has a diameter of approximately 5 cm to 8 cm.

It is further advantageous if at least one burner for supplying the second heat energy portion is situated exclusively in the melting segment. In an exemplary embodiment, a multiplicity of burners is provided, situated for example in a side wall running in the direction of flow. A fossil-based heating in the refining segment would mean only an increase in the applied heat energy, without significant improvement of the glass quality. According to the present invention, in the melting segment at least one burner is used to combust fossil combustion gas, using an oxidant, in a combustion chamber of the melt tank above the surface of the glass melt in order to produce the second heat energy portion. Here, for example an oxygen-rich gas mixture, having an oxygen portion of greater than 90% by volume, is provided as oxidant. In this case, additional preheating aggregates such as those required when air is used as oxidant can be omitted. In addition, the formation of nitrogen oxides is reduced due to the reduced nitrogen portion. In the context of the present invention, it is assumed that the energy outlay that may be required for a preheating of the oxidant is contained in the second heat energy portion.

In an exemplary embodiment of the present invention, the at least one burner, i.e. its supply of fuel, e.g. combustion gas, can be controlled in such a way that the second heat energy portion produced by the at least one burner matches the loss of heat energy that is emitted externally via the walls of the melt tank, i.e. the floor, the roof, and the side walls.

In a melt tank, energy for heat production in the first heat energy portion ($Q_{elec}$) is introduced via electrodes as electrical energy, and in the second heat energy portion ($Q_{fossil}$) it is introduced via burners through the combustion of fossil energy sources (combustion gas). The total supplied heat energy, made up of the first heat energy portion and the second heat energy portion, is converted into the energy ($Q_{chem}$) for the chemical/physical conversion of the at least one starting material from solid to liquid, the heat content of the exhaust gas ($Q_{exhaust}$), the heat content of the melted glass ($Q_{glass}$) that leaves the melt tank through the outlet opening, and the heat losses ($Q_{wall}$) via the walls of the melt tank. This means that the following holds for the heat losses via the walls of the melt tank:

$$Q_{wall} = Q_{elec} + Q_{fossil} - Q_{chem} - Q_{glass} - Q_{exhaust}$$

The measurement of temperatures and volume flows or mass flows in the melt tank, and the calculation of specific properties, make it possible according to the present invention to ascertain the energy $Q_{wall}$ wall emitted as heat loss via the outer surfaces of the melt tank. In particular, the determination of the energy portions can take place as follows:

- $Q_{fossil}$ can be determined from the energy input of the fossil fuel, with the measurable parameters heat value of the fuel, mass flow, and temperature;
- $Q_{glass}$ can be determined from the energy content of the glass leaving the melt tank, with the parameter specific heat of the glass, and the measurable parameters temperature and mass flow of the glass flow leaving the melt tank;
- $Q_{chem}$ can be determined from the energy requirement of the glass, or of the at least one starting material, for the chemical/physical conversion from solid to liquid; the energy requirement for the specific composition can be determined from the literature;
- $Q_{exhaust}$ can be determined from the heat content of the exhaust gas leaving the melt tank (from the combustion and from chemical conversions taking place in the glass melt), with the parameter specific heat and the measurable parameters mass flow and temperature of the exhaust gas leaving the melt tank, and
- $Q_{elec}$ can be determined from the measurable electrical power supply to the electrodes.

For the determination of the specific heat, for example the book Glass by Horst Scholze, 1977, p.283 may be used. The heat requirement for the melting of glass is found in the book by Wolfgang Trier, Glass melting ovens: construction and operating characteristics, 1984, p. 84. From this book, it results for example that soda-lime glass (container glass) has a heat requirement for melting of 2671 kJ/kg. The values for the specific heat of the combustion gas and of the exhaust gas can be found in the book by Joachim Wünning, Manual of burner technology for industrial ovens, 2007, p. 191.

On the basis of the quantities of heat energy determined in this way, the amount of heat energy $Q_{fossil}$ supplied by the at least one burner (i.e., for example due to its supply of fossil fuel) can be regulated or controlled.

In order to supply the glass melt with electrical energy in the area of the melting segment, it has turned out that it is advantageous to situate a multiplicity of electrodes in the floor of the melt tank in the melting segment, for example in at least one third row of electrodes running in the direction of flow. In a further exemplary embodiment, a third row of electrodes and a fourth row of electrodes that runs parallel to the third row of electrodes can be provided.

In a development of the present invention, a radiation wall is situated on the roof in the melting segment and/or in the transition area between the melting segment and the refining segment, the wall running transverse to the direction of flow, preferably in a straight (horizontal) arch, for example having a height H1 of the apex of the arch over the surface of the glass melt of at least 900 mm. A radiation wall extends from the lower surface of the roof perpendicularly downward in the direction of the upper surface of the glass melt. The radiation wall ensures that the energy released by the fossil fuel largely remains available solely in the melting segment. In the refining segment, adequate energy is provided by the supplied electrical energy. The spacing of the radiation wall from the rear wall of the melt tank is preferably at most 35% of the overall length of the melt tank (in the direction of flow of the glass) from the inlet opening to the outlet opening. In the case in which the radiation wall is situated in the melting segment, the (at least one) burner for producing the second heat energy portion can also be situated after the radiation wall in the direction of flow of the glass melt.

In addition, the above object is achieved by a glass melting plant having a melt tank having the features explained above, a constriction region following the melt tank, a conditioning region, and a channel.

In the constriction region, the width of the basin is reduced following the melt tank. This has the advantage that the flow speed of the glass melt is reduced.

In an exemplary embodiment, in the constriction region at least one cooling element is situated on the cover of the constriction region. This at least one cooling element extends perpendicularly from the cover into the glass melt, has for example the shape of a plate, and is cooled e.g. by water. The at least one cooling element also acts to reduce the flow speed of the glass melt.

In an exemplary embodiment of the glass melting plant according to the present invention, bath depth B3 of the conditioning region is less than or equal to bath depth B2 of the refining segment. In addition, bath depth B4 of the channel can be less than or equal to bath depth B3 of the conditioning region. When there is a reduction of the bath depth from one region to another, in each case a step is situated between the regions. Here, bath depth B3 of the conditioning region and/or bath depth B4 of the channel can be smaller than the third bath depth over the threshold.

In addition, the objects may be achieved by a method for producing a glass melt in a melt tank as presented above. According to the present invention, the glass melt is produced from at least one solid starting material, the at least one solid starting material being supplied to the inlet opening for example continuously by a supply device (feeder), and the melted glass flowing out from the outlet opening, the glass melt flowing in a direction of flow from the inlet opening to the outlet opening during the melt process. In the melt tank, the glass and/or the at least one starting material first passes through, in the direction of flow, the melting segment and subsequently the refining segment, and passes over the threshold running transverse to the direction of flow in the floor of the glass melt tank between the melting segment and the refining segment, the third bath depth B5 over the threshold (27) being less than the first (minimum) bath depth B1, and less than the second (minimum) bath depth B2. For the melting of the at least one starting material, the electrically produced, first heat energy portion is supplied to the glass melt by the multiplicity of electrodes situated in the floor and/or in the side walls of the melt tank and extending into the glass melt, and the second heat energy portion, produced by the combustion of fossil fuel, is supplied to the glass melt by the at least one burner situated in a side wall and/or in the roof above the glass melt, the total quantity of heat energy supplied being made up of the first heat energy portion and the second heat energy portion, the first heat energy portion being at least 30%, preferably more than 60%, of the overall supplied heat energy, at least a part of the first heat energy portion being produced by a first row of electrodes, including a multiplicity of electrodes, on the threshold in the floor of the melt tank, running transverse to the direction of flow. The method according to the present invention promotes the rise of bubbles in the glass melt, and promotes cost efficiency in the production of the glass melt.

In an exemplary embodiment of the method according to the present invention, the at least one burner (e.g. its supply of fuel) is regulated or controlled in such a way that the second heat energy portion produced by the at least one burner matches the loss of heat energy emitted externally via the melt tank. This procedure has been described above in detail. In particular, the possible specific embodiments for the first heat energy portion and the second heat energy portion, which also hold for the method according to the present invention, are explained above.

Further features, advantages, and possible uses of the present invention also result from the following description of exemplary embodiments shown in the Figures.

DESCRIPTION OF THE DRAWINGS

FIGS. 1A and 1B shows a first exemplary embodiment of a glass melting plant according to the present invention having a melt tank according to the present invention, in a vertical longitudinal section (1A)) and a horizontal cross-section (1B)), FIGS. 2A and 2B shows a second exemplary embodiment of a glass melting plant according to the present invention having a melt tank according to the present invention, in a longitudinal section (2A)) and a horizontal cross-section (2B)), FIG. 8 shows a segment of a melt tank according to the present invention of a fourth exemplary embodiment of a glass melting plant according to the present invention, FIGS. 9A to 9C shows a comparison of the temperature at the surface of the glass over the step for the specific embodiment 7A) according to the present invention with conventional variants of the configuration of electrodes (7B) and (7C), and a representation from the simulation, in a vertical longitudinal section, and FIGS. 10A and 10B and 11A and 11B show a model calculation with the formation of bubbles in the feeder region, the bubbles in FIGS. 10A and 10B being formed at the right feeding side and in FIGS. 11A and 11B at the left feeding side of the melt tank, in each case in a horizontal cross-section (a) and in a vertical longitudinal section (b) through the melt tank.

DETAILED DESCRIPTION

Figure 4:
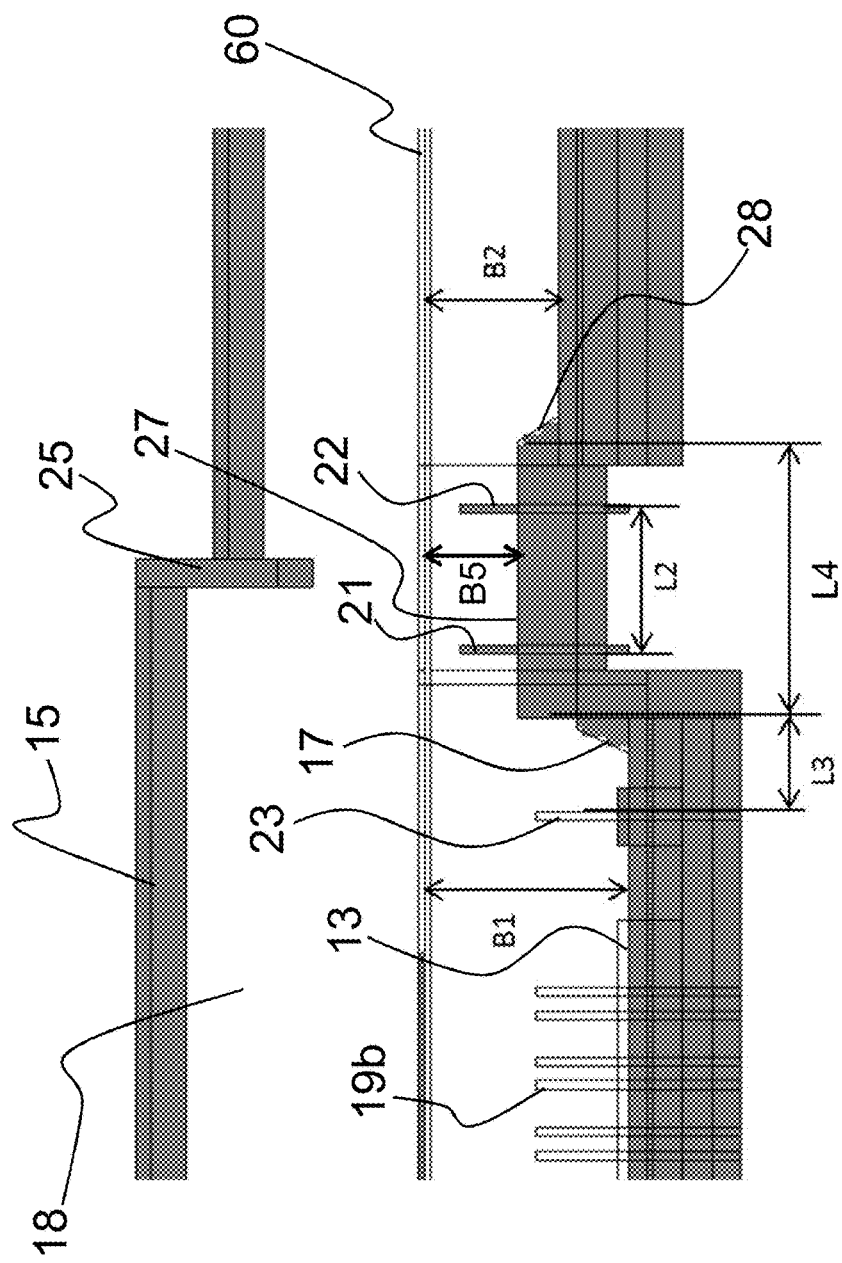
FIG. 4 shows a segment of FIG. 2A) with dimensions.

FIGS. 1A and 1B shows a first exemplary embodiment of a glass melting plant according to the present invention having a melt tank according to the present invention, suitable for example for a daily output of 400 t of molten glass.

The melt tank includes the segments melting segment 10 and refining segment 20. The melt tank is followed by a constriction region 30, a conditioning region 40, and a channel 50. The starting materials for the production of the glass melt (primary raw materials and, possibly, shards) are continuously supplied at inlet opening 11 of the melt tank by a feed device (not shown). The starting materials are in particular melted in the melting segment 10 of the melt tank, and move (flow) together with glass melt 60 through refining segment 20, to outlet opening 12 of the melt tank, and further through constriction region 30, conditioning region 40, and channel 50, until they reach glass outlet opening 52. The direction of flow of glass melt 60 is indicated by an arrow 5 in FIGS. 1A) and 1B).

The melt tank has a floor 13, a roof 15 that is situated opposite floor 13, and side walls 16. In the exemplary embodiment shown in FIGS. 1A and 1B, lateral side walls 16 run parallel to the direction of flow of glass melt 60. In the context of the present invention (i.e. for all possible exemplary embodiments), the walls in the area of inlet opening 11 and outlet opening 12, which run transverse to the direction of flow, are also regarded as side walls.

Floor 13 of the melt tank has a rising step 17 and a falling step 28 that run transverse to the direction of flow of the glass melt, in particular perpendicular to the direction of flow, and are situated in the area of transition between melting segment 10 and refining segment 20. The two steps 17, 28 together form a threshold 27. Step 17 is in a sense the beginning of refining segment 20. Bath depth B1 in melting segment 10, which is the minimum of all bath depths in melting segment 10, is greater than bath depth B2 in the direction of flow after falling step 28, i.e. in refining segment 20. Bath depth B2 is the minimum of all bath depths in refining segment 20, the bath depths over threshold 27 and the electrodes that may be situated there not being taken into account in the ascertaining of the minima in the refining segment and in the melting segment.

In the direction of flow of the glass melt after first step 17, i.e. at threshold 27 in the transition area between melting segment 10 and refining segment 20, a first row of electrodes 21, having a multiplicity of electrodes situated alongside each other, and a second row of electrodes 22, also having a multiplicity of electrodes situated alongside each other, are provided. The electrodes, realized as rod electrodes, each go out perpendicularly upward from floor 13 of the melt tank and extend into glass melt 60. Alternatively, the electrodes of rows of electrodes 21, 22 can be realized at least partly as block electrodes; a block electrode is shown in section in FIG. 8. The row of block electrodes is designated by reference character 21a. Each row of electrodes 21, 22 runs transverse to the direction of flow. Because the electrodes of first row of electrodes 21 and of second row of electrodes 22 are situated after first step 17, seen in the direction of flow, they are situated in the region of floor 13, namely in the region of threshold 27, that has the smaller bath depth B5 in comparison with melting segment 10. The (minimum) bath depth B1 of melting segment 10 is between 1100 mm, preferably between 1400 mm, and 2000 mm, for example 1700 mm. The (minimum) bath depth B2 of refining segment 20 is between 700 mm and 1400 mm, for example 1100 mm. The electrodes situated one after the other in first row of electrodes 21 and in second row of electrodes 22 can be situated one after the other in the direction of flow (as in FIGS. 1A and 1B and 2A and 2B), or offset to one another.

For the heating of glass melt 60 using electrical energy, a third row of electrodes 19a and a fourth row of electrodes 19b are provided in melting segment 10, each also having a multiplicity of electrodes (e.g. rod electrodes) situated alongside one another, which extend from floor 13 into glass melt 16. Third row of electrodes 19a and fourth row of electrodes 19b each run in the direction of flow (arrow 5) of glass melt 60. Correspondingly, the orientation of third and fourth rows of electrodes 19a and 19b is perpendicular to the orientation of first and second rows of electrodes 21, 22. It is also possible for more than two rows of electrodes running in the direction of flow of the glass melt to be provided in melting segment 10.

Before step 17, in the direction of flow of the glass melt, there can be situated a further row of electrodes 23 having a multiplicity of electrodes (e.g. rod electrodes) situated alongside one another, transverse to the direction of flow, and extending upward from floor 13 of the melt tank into melt 60. Accordingly, the further row of electrodes 23 runs parallel to first row of electrodes 21 and to second row of electrodes 22. Further row of electrodes 23 is situated at a distance of for example 500 mm to 1500 mm, e.g. 800 mm, before the upper edge of the first step, i.e. still in the melting segment. The electrodes of further row of electrodes 23 are configured offset to the electrodes of the rows of electrodes 21, 22 provided on threshold 27.

In addition, in each of the two side walls 16 that run parallel to the direction of flow of glass melt 60, there are situated for example two burners 19c that supply heat energy to glass melt 60, the energy being produced by combustion of the fossil fuel gas using an oxidant in combustion chamber 18. The openings of burners 19c are situated in side walls 16 above the surface of glass melt 60, so that the burners heat the melt from above via combustion chamber 18. One burner 19c is situated above threshold 27.

Figure 3:
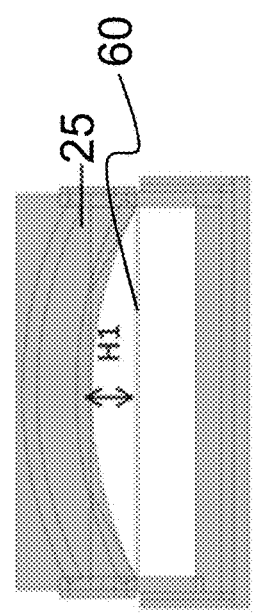
FIG. 3 shows the exemplary embodiment of FIG. 2 in a vertical cross-section along the line A-A (see FIG. 2A))

In addition, a radiation wall 25 that runs downward from roof 15 in the direction of glass melt 60 can be provided in refining segment 20, above first row of electrodes 21 or second row of electrodes 22, or between these rows of electrodes 21, 22, as shown in FIGS. 2A through 4. Preferably, radiation wall 25 terminates above the glass melt as a straight (horizontal) arch. Such an arch is shown in FIG. 3. The apex of the arch has a height H1 above the surface of glass melt 60 that is at least 900 mm. As shown in FIG. 3, radiation wall 25 has a distance L1 from outlet opening 12 of the melt tank (see FIG. 2) that is at most 35% of the overall length of the melt tank between inlet opening 11 and outlet opening 12. Length L1 from radiation wall 25 to outlet opening 12 of the melt tank is for example 1500 mm to 3000 mm, for example 2150 mm.

In the region of constriction 30, in addition a cooling element 32 is situated that protrudes downward from the cover 15 of constriction region 30 and is immersed in glass melt 60. Cooling element 32 is for example cooled by water, and has the shape of a plate.

In conditioning region 40 and channel 50, bath depths B3 and B4, as shown in FIGS. 1A and 1B, can be further decreased.

FIGS. 2A and 2B shows a further exemplary embodiment of a glass melting plant according to the present invention having a melt tank according to the present invention that also differs from the exemplary embodiment shown in FIGS. 1A and 1B in that roof 15 is lower in the region after radiation wall 25. In the lowered region, the roof has a height H3 over the surface of glass melt 60 that is for example 50% to 80% of height H2. The vault height H3 in refining segment 20 after radiation wall 25 can for example be 65% of height H2 in melting segment 10, or in refining segment 20 before radiation wall 25. Here, height H2 is the distance of the lower service of roof 15 from the surface of glass melt 60 in melting segment 10. Length L1 of the lowered region from radiation wall 25 up to outlet opening 12 of the melt tank is for example 1500 mm to 3000 mm, for example 2150 mm.

In the specific embodiments shown in FIGS. 1A through 4 and 6 of a melt tank, or a glass melting plant, floor 13 of the melt tank in refining segment 20 forms a first threshold 27 that begins at first step 17 and has a length L4 in the direction of flow of glass melt 60 (see FIGS. 1A, 1B, 2A, 2B, and 4), the length L4 being between 700 mm and 3000 mm. In the area of first threshold 27, the floor of the melt tank has a bath depth B5 that is smaller than the bath depth B2 after first threshold 27 in refining segment 20. Bath depth B5 is for example between 200 mm and 1000 mm, for example 800 mm First row of electrodes 21 and second row of electrodes 22 are situated in the area of threshold 27, i.e. on threshold 27, as is shown in FIGS. 1A, 1B, 2A, 2B, and 4. At the end of threshold 27, in the direction of flow of the glass melt, the threshold has a second step 28 via which the bath depth in refining segment 20 again increases to the value B2. As explained above, threshold 27, and the electrodes situated thereon, bring about the rise of bubbles present in the glass melt, and thus bring about an improvement of the glass quality. The electrically heated threshold 27 forms the highest barrier in the melt tank between inlet opening 11 and outlet opening 12.

Figure 6:
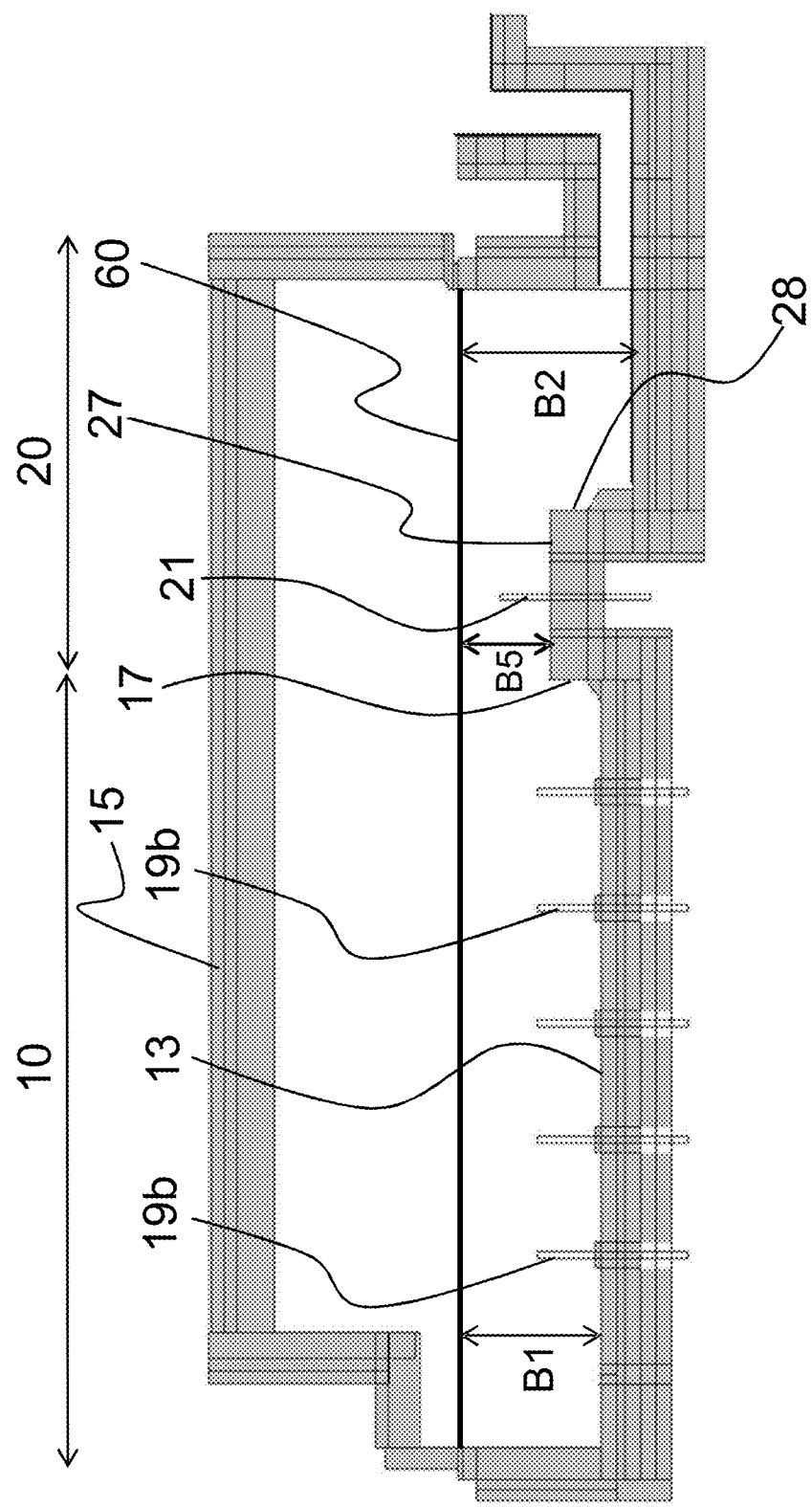
FIG. 6 shows a third exemplary embodiment of a glass melting plant according to the present invention having a melt tank according to the present invention, in a longitudinal section.

FIG. 6 shows the melt tank of a fifth exemplary embodiment of a glass melting plant for producing container glass. This exemplary embodiment largely corresponds to the exemplary embodiment shown in FIGS. 2A through 4, so that reference is made to that exemplary embodiment, the exemplary embodiments discussed in relation to FIGS. 1A through 4 being more suitable for the production of flat glass.

In the melt tank shown in FIG. 6, bath depth B2 of the refining segment after threshold 27 is greater than bath depth B1 of the melting segment, and bath depth B5 over threshold 27 is less than bath depth B1 of the melting segment. In addition, threshold 27 has only one row 21 of electrodes situated alongside one another, whereas at least two electrode rows are provided on the threshold in each of the exemplary embodiments according to FIGS. 1A through 4. In this exemplary embodiment, bath depth B1 is for example between 1100 mm and 2000 mm, for example 1400 mm Bath depth B2 is between 1200 mm and 2200 mm, for example 1800 mm Bath depth B5 over threshold 27 is for example between 200 mm and 1000 mm. In addition, no radiation wall extending from roof 15 is provided.

The design of the present invention has been tested in extensive modeling calculations, in particular for throughput quantities of from 300 t to 800 t glass melt per day. For high throughput quantities, the dimensions in melting segment 10 and in refining segment 20, (i.e. length and width of the melt tank) have to be adapted. In contrast, the bath depths and the width of threshold 27 in the direction of flow, and the height of threshold 27, are not changed. Of course, the width of threshold 27 transverse to the direction of flow is matched to the width of the melt tank in melting segment 10 and in refining segment 20. Correspondingly, the number of electrodes situated alongside one another in rows of electrodes 21, 22, 23 also increases.

Figure 5:
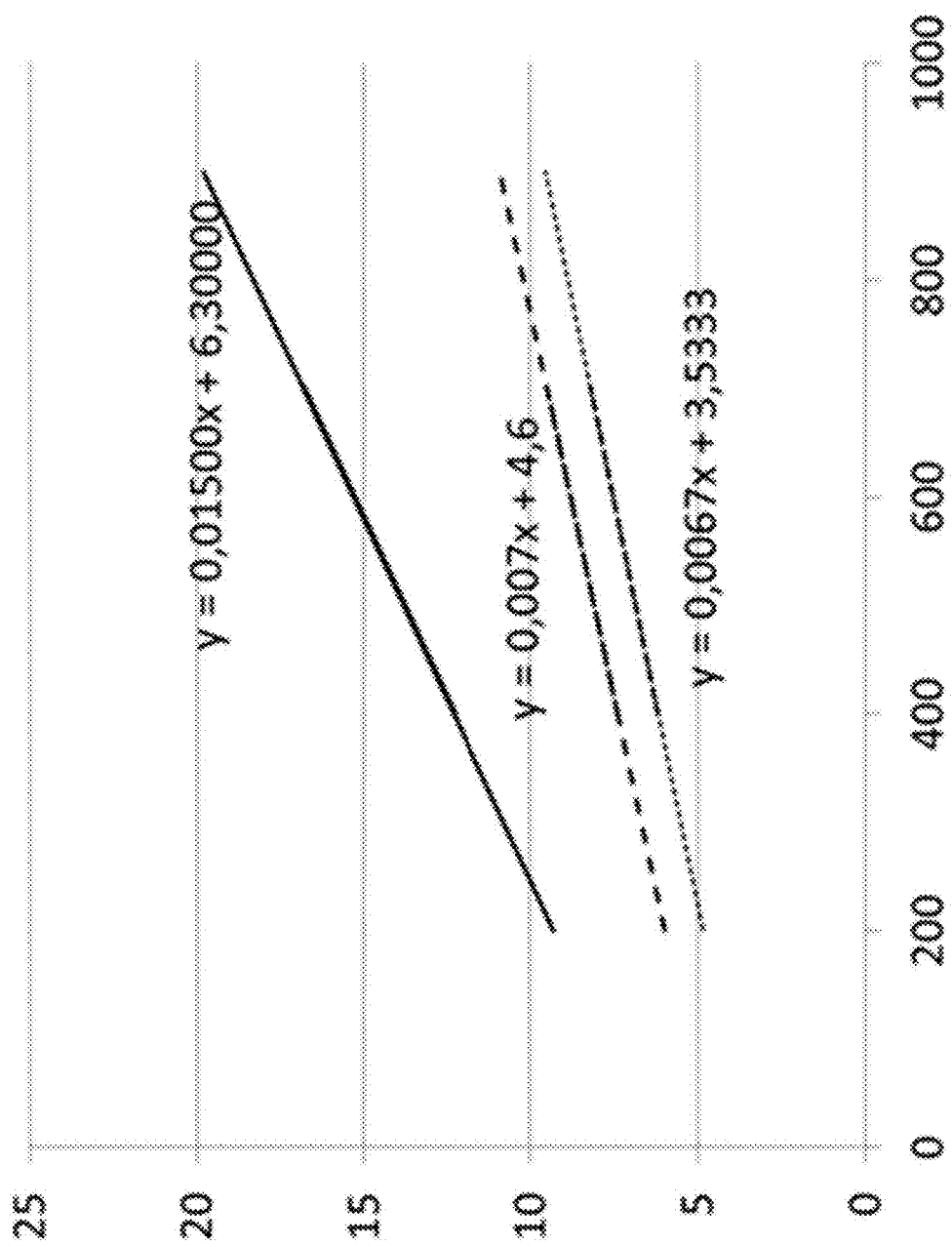
FIG. 5 shows, in a diagram, the functional dependence of the length of the melting segment (y axis, in meters) on the planned throughput of the glass melting plant (in tons/day) via the upper solid line, the functional dependence of the length of the refining segment (in meters) on the planned throughput of the glass melting plant (x axis, in tons/day) via the center, dashed line, and the functional dependence of the width of the melt tank in the melting segment and in the refining segment (in meters) on the planned throughput (in tons/day) via the lower dotted line.

In FIG. 5, the solid curve illustrates the relation between the length of melting segment 10 (in meters) as a function of the throughput (in tons/day) of the melt tank or of the glass melting plant; the dashed curve illustrates the relation between the length of refining segment 20 (in meters) as a function of the throughput (tons/day); the dotted curve illustrates the width of melting segment 10 and refining segment 20 transverse to the direction of flow (in meters) as a function of the throughput (tons/day). For example, for a throughput of 400 t glass melt per day, a length of melting segment 10 of approximately 12.5 m is required, whereas for a throughput of 700 t glass melt per day a length of melting segment 10 of approximately 17 m is required.

According to the present invention, it is decisive that the dimensioning of threshold 27, including the dimensioning of the electrodes situated on the threshold, ensures that bubbles that have a particular minimum diameter will move to the surface. In the following Table 1, suitable geometrical relations are shown for bubbles having a size >0.2 mm Here, the rise of the bubbles is calculated according to Stoke's Law. From Table 1, it can be seen that for all three calculated throughput quantities, bubbles having a standard diameter >0.23 mm had enough time to reach the surface of the glass melt. Here, the rise time is equal to the dwell time of the glass melt in refining segment 20, in the upper layer of the glass melt.

TABLE 1

| | | | | |
|---|---|---|---|---|
| Throughput | kg/day | 400,000 | 500,000 | 700,000 |
| Melt density | kg/m$^3$ | 2400 | 2400 | 2400 |
| Melt bath temperature | °C. | 1480 | 1480 | 1480 |
| Melt bath viscosity | Pascal (kg/m*s) | 6.4 | 6.4 | 6.4 |
| Bubble diameter | mm | 0.23 | 0.23 | 0.23 |
| Rise speed | m/s | 4.21E−05 | 4.21E−05 | 4.21E−05 |
| Refining zone | | | | |
| Basin length | m | 6.2 | 7.2 | 8.2 |
| Basin width | m | 7.4 | 8.45 | 9.5 |
| Pre-flow layer thickness | m | 0.135 | 0.135 | 0.135 |
| Melt dwell time in refining part | min | 53.51 | 51.61 | 51.92 |
| Bubble rise time | min | 53.5 | 51.6 | 52 |

The following Table 2 contains, in each column, three examples of the realization of a glass melting plant according to the present invention that corresponds to the exemplary embodiment according to FIG. 6. The first two columns contain glass melting plants for producing container glass, and the last column contains the data for a glass melting plant for producing flat glass. The second column contains the respective dimensional unit. Threshold 27 is designated "electrode wall" in the table. The abbreviation "el." stands for electrodes, and "portion of boosting in total energy" refers to the ratio $Q_{elec}/(Q_{elec}+Q_{fossil})$, i.e. the portion of the electrical energy in the total supplied fossil), heat energy, expressed in %. The portion of the electrical heating in the total energy is more than 60% in all three cases, as shown in the table. In all three examples, a large number of the bubbles that occur in the melt rise to the surface of the glass melt inside the melt tank, so that a good glass quality is achieved.

TABLE 2

|  |  | Glass type/product | | |
|---|---|---|---|---|
|  |  | Container glass | Container glass | Flat glass |
| Melt output | t glass/day | 350.00 | 160.00 | 110.00 |
| Melt surface | m$^2$ | 135.42 | 80.04 | 90.00 |
| Melt tank length | m | 18.30 | 13.80 | 15.08 |
| Melt tank width | m | 7.40 | 5.80 | 6.00 |
| Length of the electrode wall | m | 2.50 | 1.96 | 2.10 |
| Melting part (10) | m | 13.00 | 10.80 | 9.17 |
| Refining part (20) | m | 5.40 | 4.00 | 5.91 |
| Bath depth melting part (B1) | m | 1.40 | 1.30 | 1.40 |
| Bath depth refining part (B2) | m | 1.75 | 1.60 | 1.25 |
| Glass over electrode wall (B5) | m | 0.825 | 0.825 | 0.85 |
| Number of electrodes in the melting part |  | 36 | 24 | 24 |
| Number of el. on the electrode wall |  | 6 | 6 | 6 |
| Portion of boosting in total energy | % | 80 | 64 | 76 |
| Electrical energy | kW | 9330 | 5500 | 5250 |
| Fossil energy (natural gas | m$^3$/h | 235 | 300 | 155 |
| Heat value natural gas | kWh/m$^3$ | 10 | 10.56 | 10 |

Figures 7A, 7B, 7C:
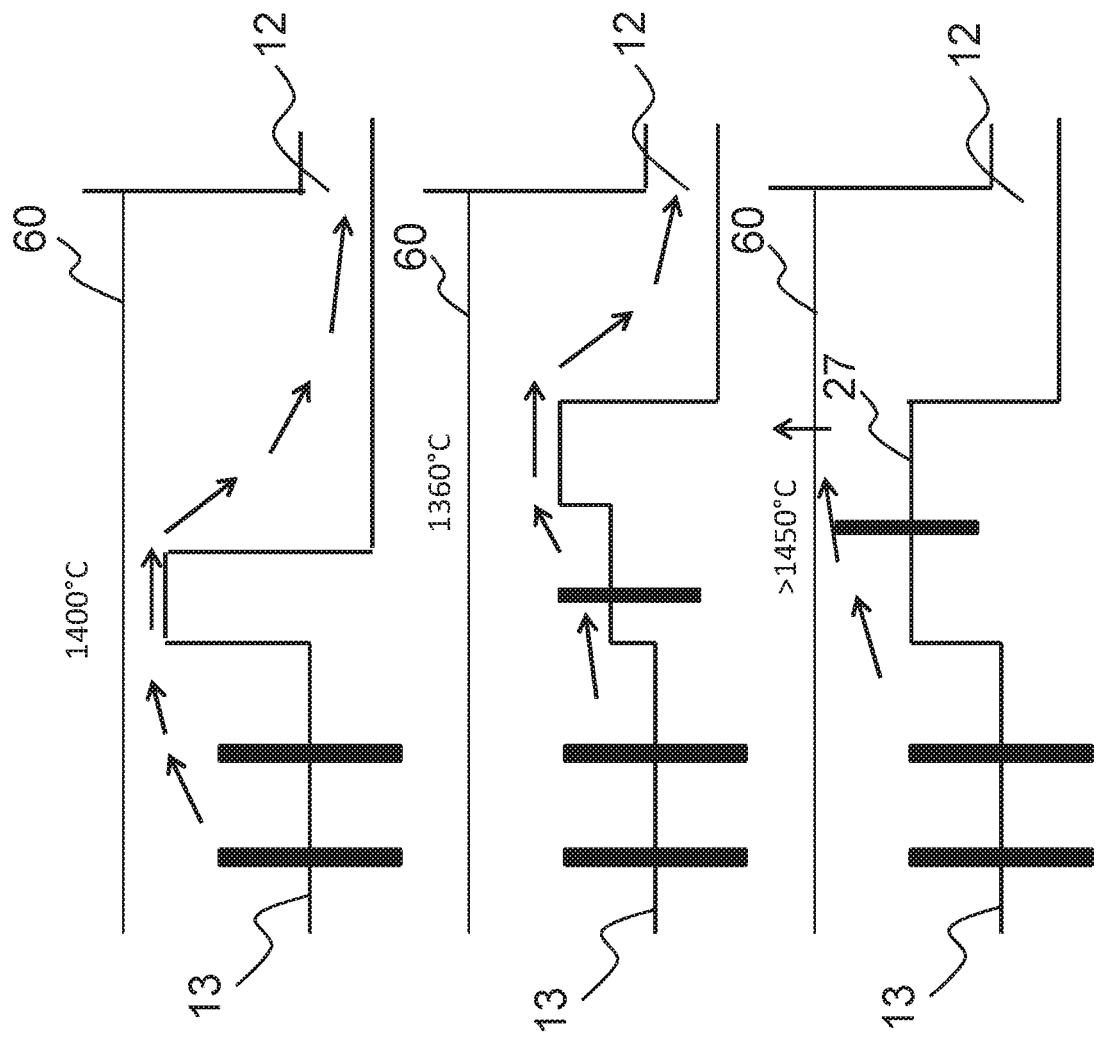
FIGS. 7A to 7C shows the specific embodiment 7C) according to the present invention in direct comparison with conventional variants of the configuration of electrodes (7A) (document Müller) and 7B) (document Pieper), with regard to the step.

FIGS. 7A to 7C shows a comparison of the constructions of the melt tanks according to the existing art (FIGS. 7A and 7B) with the solution according to the present invention (FIG. 7C) based on mathematical modeling calculations. FIG. 7C corresponds to the exemplary embodiment shown in FIG. 1, while FIG. 7A approximately shows the situation of the document by Müller, and FIG. 7B shows a realization of the document of Pieper. The FIGS. 7A to 7C each show the profile of the floor 13 of the melt tank in the region of the transition from the melting part of the refining part, the electrodes (black, thick, vertically running columns), as well as the surface of the glass melt 60. The calculated temperature at the surface of the glass melt over the highest barrier, or at the smallest bath depth, is indicated in the FIGS. 7A to 7C. In the model calculation, a portion of electrical energy greater than 60% in the total supplied heat energy was assumed. In the simulations, it turns out that the respectively indicated temperature at the surface of the glass melt (in FIGS. 7A and 7B, 1400° C. and 1360° C. respectively) is too low, and the bubbles, whose path in the glass melt is indicated by the arrows, sink again after crossing the barrier, because they have too little upward drive. Only in the solution according to the present invention, shown in FIG. 7C, is the surface temperature (1450° C.) due to the heating of threshold 27, and thus the rise of the bubbles, adequate for a significant portion of the bubbles to rise to the surface of the glass melt and for the gas to escape from the glass melt.

The same also results from the results of simulation calculations shown in FIGS. 9A to 9C. Here, the system of FIG. 9A corresponds to FIG. 7C, the system of FIG. 9B corresponds to FIG. 7A, and the system of FIG. 9C corresponds to FIG. 7B. The melt bath surface was 91 m$^2$. For the simulations, bath depth B1 in melting part 10 was 1500 mm in all cases. The realization according to the present invention (FIG. 9A) had a threshold 27 having a length of 2100 mm and a bath depth B5 of 800 mm. The variant of FIG. 9B (corresponding to the document of Müller) had a highest barrier wall (without electrodes) having a bath depth of 300 mm in the area of the wall. The system according to FIG. 9C had a refining bank as highest barrier (without electrodes), having a length of 1800 mm and having a bath depth over the refining bank of 1000 mm Before the refining bank, electrodes are situated on a lower shoulder situated in front of the bank. In all cases, the throughput was 250 t/day of clear glass with 45% input of shards. The fossil energy input was 3340 kW and the electrical energy input was 5380 kW, i.e. about 60% of the total supplied heat energy.

The simulations showed that an adequately high temperature at the glass bath surface (see FIG. 9A) that significantly promotes the rise of the bubbles is achieved only with a threshold in which the glass flowing over the threshold is heated by electrodes.

The mathematical simulation makes it possible to also evaluate the refining performance. For this purpose, in the model bubbles having smaller size are defined in a layer below the glass melt surface in the melting region. These correspond to the bubbles that occur when the carbonates are decomposed during the melting of the raw materials. These bubbles move through the melt tank with the flow. The temperature increase along this path is the cause of the growth in size of the bubbles (expansion of the gas) and the increasing rise speed, in accordance with Stoke's Law; this is taken into account in the mathematical simulation calculation. In the model, it can be seen that the bubbles will grow and rise to such an extent that the glass melt is free of bubbles after the barrier only if a threshold is used having electrodes situated on the surface of the threshold. In the two other cases, a significant number of bubbles move across the barrier into the output glass flow, or into the product. The calculation has confirmed that adequate glass quality is ensured only given the use of a heated threshold with a large portion of electrical energy relative to the total supplied heat energy—under the constraint that the energy input from fossil fuels is significantly limited.

The above observations are illustrated in FIGS. 10A and 10B and 11A and 11B on the basis of the path shown there of the bubbles in glass melt 60. FIGS. 10A and 10B and 11A and 11B each show a model calculation with a formation of, in each case, 4000 bubbles, having a diameter of 0.2 mm, in the area of inlet opening 11; in FIGS. 10A and 10B, the bubbles are formed at the right inlet side, and in FIGS. 11A and 11B the bubbles are formed at the left inlet side. The parameters of the simulation match the parameters used with regard to FIGS. 9A to 9C. In FIGS. 10A and 10B and 11A and 11B, for reasons of clarity only a small portion of the calculated 4000 bubbles is shown. Moreover, in a real glass melting tank many times more than the calculated number of 4000 bubbles are present.

As explained above, the bubbles become larger along their path in circulating glass melt 60. It will be seen that all bubbles rise to the surface. Their escape at the surface is identified by a point at the end of the line of movement of each bubble. For all the bubbles calculated in the model, there is no path that extends up to outlet opening 12. The simulation shows the case of a model having a heated threshold and a high portion of electrical energy in the total supplied heat energy.

In the cases shown in FIGS. 7A and 7B, or 9B and 9C, (not shown in FIGS. 10A and 10B and 11A and 11B), in which only a simple barrier without heating is present, or a refining bank, i.e. a barrier having a pre-step that has electrodes, is present, in contrast a significantly large number of bubbles reach the outlet opening, and therefore remain in the glass melt, reducing its quality.

The invention claimed is:

1. A melt tank for the production of a glass melt from at least one solid starting material, the melt tank comprising:
    an inlet opening for a supply of the at least one solid starting material, an outlet opening for an outflow of a molten glass, the melt tank configured in such a way that the glass melt flows in a direction of flow from the inlet opening to the outlet opening during the melt process;
    a floor that limits the melt tank at a bottom;
    at least two side walls that adjoin the floor and that laterally limit the melt tank; and,
    a roof that is connected to the side walls and that limits the melt tank at a top,
    wherein the melt tank includes a melting segment and a refining segment, the glass melt first passing through the melting segment and subsequently through the refining segment when flowing in the direction of flow, wherein an atmosphere above the glass melt in the melting segment is in communication with an atmosphere above the glass melt in the refining segment,
    the glass melt having a first bath depth B1 in the melting segment and having a second bath depth B2 in the refining segment, a threshold running transverse to the direction of flow being situated in the floor of the melt tank in a transition area of the melt tank between the melting segment and the refining segment, a third bath depth B5 over the threshold being smaller than the first bath depth B1 and smaller than the second bath depth B2, wherein the threshold forms a highest raised part in the floor of the melting tank with a smallest bath depth,
    the melt tank being configured such that for the melting of the at least one starting material of the glass melt:
    an electrically produced, first heat energy portion ($Q_{elec}$) is supplied via a multiplicity of electrodes that extend into the glass melt, and
    a second heat energy portion ($Q_{fossil}$), produced by a combustion of fossil fuel, is supplied in at least one burner situated in a side wall, in the roof, or both, above the glass melt,
    a total supplied heat energy being made up of the first heat energy portion and the second heat energy portion,
    wherein the melt tank is configured in such a way that the first heat energy portion comprises at least 30% of the total supplied heat energy, and,
    wherein a first row of electrodes is situated in the floor of the melt tank on the threshold, in the glass melt flow, the first row of electrodes including a multiplicity of electrodes and the first row of electrodes running transverse to the direction of flow.

2. The melt tank as recited in claim 1, wherein a second row of electrodes, is situated in the floor of the melt tank at a distance L2 after the first row of electrodes in the direction of flow, wherein the second row of electrodes including a multiplicity of electrodes and the second row of electrodes running transverse to the direction of flow and, and the second row of electrodes also being situated on the threshold.

3. The melt tank of claim 2, wherein the distance L2 is between 500 mm and 1000 mm.

4. The melt tank of claim 1, wherein the third bath depth B5 over the threshold is between 200 mm and 1000 mm.

5. The melt tank of claim 1, wherein the first bath depth B1 in the melting segment is between 1100 mm and 2000 mm, and the second bath depth B2 in the refining segment is between 700 mm and 2800 mm.

6. The melt tank of claim 5, wherein the first bath depth B1 in the melting segment (10) is between 1400 mm and 2000 mm.

7. The melt tank of claim 1, wherein the multiplicity of electrodes situated on the threshold are rod electrodes and/or block electrodes.

8. The melt tank of claim 1, wherein the length L4 of the threshold is between 700 mm and 3000 mm in the direction of flow.

9. The melt tank as recited of claim 1, wherein the at least one burner for supplying the second heat energy portion is situated exclusively in the melting segment.

10. The melt tank of claim 9, further comprising:
    a multiplicity of burners situated in a side wall running in the direction of flow.

11. The melt tank of claim 1, wherein the at least one burner is controllable in such a way that the second heat energy portion ($Q_{fossil}$) produced by the at least one burner corresponds to a loss of heat energy ($Q_{wall}$) that is emitted to an outside via the melt tank.

12. The melt tank of claim 1, characterized in that a multiplicity of electrodes is situated in the melting segment in the floor of the melt tank.

13. The melt tank of claim 1, wherein a radiation wall is situated on the roof, at the melting segment, at the transition area between the melting segment and the refining segment, or at both, the radiation wall running transverse to the direction of flow.

14. The melt tank of claim 1, wherein a further row of electrodes is situated in the floor of the melt tank, before the threshold in the floor of the melt tank in the direction of flow of the glass melt, the further row of electrodes including a multiplicity of electrodes and the further row of electrodes running transverse to the direction of flow.

15. A glass melting plant comprising:
    a melt tank of claim 1, a constriction region following the melt tank, a conditioning region, and a channel.

16. The glass melting plant as recited in claim 15, wherein at least one cooling element is situated in the constriction region, on a cover of the constriction region.

17. The melt tank of claim 1, wherein a multiplicity of electrodes is situated in the melting segment in the floor of the melt tank in at least one third row of electrodes, the at least one third row of electrodes running in the direction of flow.

18. A melt tank for the production of a glass melt from at least one solid starting material, the melt tank comprising:
    an inlet opening for a supply of the at least one solid starting material, an outlet opening for an outflow of a molten glass, the melt tank configured in such a way that the glass melt flows in a direction of flow from the inlet opening to the outlet opening during the melt process;
a floor that limits the melt tank at a bottom;
at least two side walls that adjoin the floor and that laterally limit the melt tank; and,
a roof that is connected to the side walls and that limits the melt tank at a top,
wherein the melt tank includes a melting segment and a refining segment, the glass melt first passing through the melting segment and subsequently through the refining segment when flowing in the direction of flow, wherein an atmosphere above the glass melt in the melting segment is in communication with an atmosphere above the glass melt in the refining segment,
the glass melt having a first bath depth B1 in the melting segment and having a second bath depth B2 in the refining segment, a threshold running transverse to the direction of flow being situated in the floor of the melt tank in a transition area of the melt tank between the melting segment and the refining segment, a third bath depth B5 over the threshold being smaller than the first bath depth B1 and smaller than the second bath depth B2, wherein the threshold forms a highest raised part in the floor of the melting tank with a smallest bath depth, the melt tank being configured such that for the melting of the at least one starting material of the glass melt:
an electrically produced, first heat energy portion ($Q_{elec}$) is supplied via a multiplicity of electrodes that extend into the glass melt, and
a second heat energy portion ($Q_{fossil}$), produced by a combustion of fossil fuel, is supplied in at least one burner situated in a side wall, in the roof, or both, above the glass melt,
a total supplied heat energy being made up of the first heat energy portion and the second heat energy portion,
wherein the melt tank is configured in such a way that the first heat energy portion comprises at least 30% of the total supplied heat energy,
wherein a first row of electrodes is situated in the floor of the melt tank on the threshold, in the glass melt flow, the first row of electrodes including a multiplicity of electrodes and the first row of electrodes running transverse to the direction of flow, and
wherein a section of the roof is configured such that a lower surface of the section is distanced from the glass melt surface, wherein the section comprises the melting segment to a beginning of the threshold.

* * * * *